June 28, 1949.  T. C. VAN DEGRIFT  2,474,408

TORSIONAL VIBRATION EXHIBITING MEANS

Filed March 19, 1945

Inventor
Thomas C. Van Degrift
By
Bachmon, Spencer & Flint
Attorneys

Patented June 28, 1949

2,474,408

UNITED STATES PATENT OFFICE 2,474,408

TORSIONAL VIBRATION EXHIBITING MEANS

Thomas C. Van Degrift, Detroit, Mich., assignor to General Motors Corporation, Detroit, Mich., a corporation of Delaware Application March 19, 1945, Serial No. 583,528

8 Claims. (Cl. 346—7)

This invention relates to instruments for detecting torsional vibration in shafts and for indicating and recording their period and amplitude; it is designed particularly to aid in ascertaining facts and to record data with respect to the torsional vibration of crankshafts of internal combustion engines.

The primary object of this invention is to provide an improved mechanical torsional vibration indicator of simple construction. Another object is to provide a small hand type of mechanical torsional vibration indicator that can be coupled to a rotating engine crankshaft without slowing or stopping the engine. A further object of the invention is to provide an improved torsional vibration exhibiting device in which the indicator mechanism is operative only when records are being taken. Other objects and advantages of the invention will be apparent from the following description, reference being made to the accompanying drawings wherein one form of embodiment of the present invention is illustrated.

Figure 1:
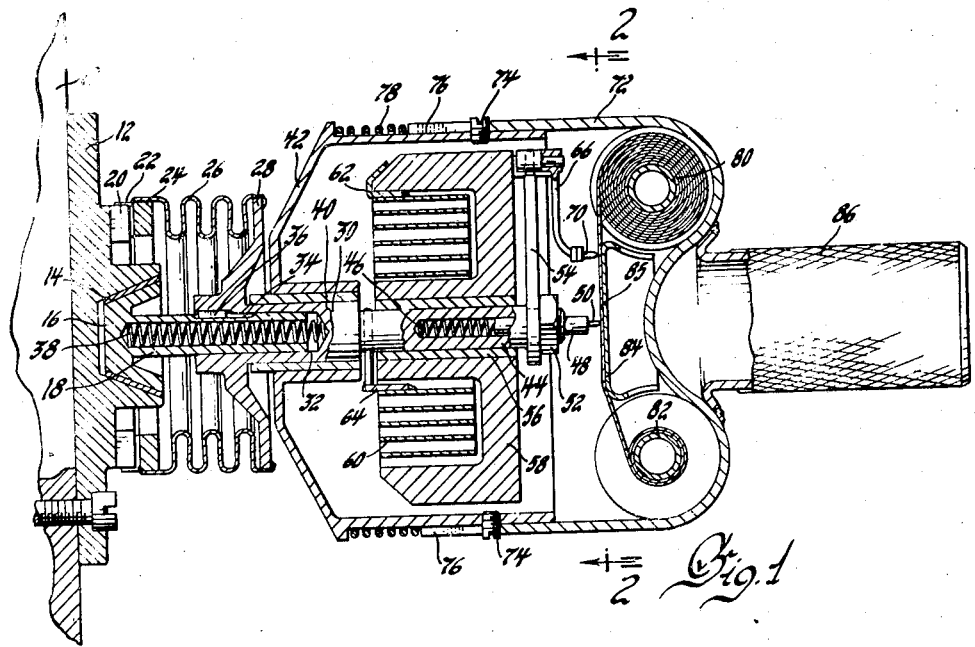
Figure 1 is a sectional view of an instrument for detecting, indicating and recording torsional vibration in an engine crankshaft, the end portion only of the crankshaft to be tested being shown.
Figure 2:
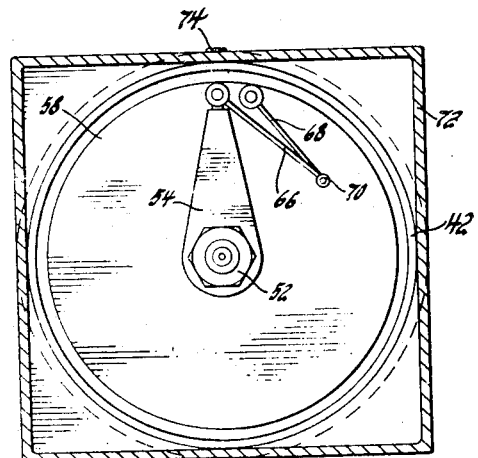
Figure 2 is a view taken substantially on line 2—2 in Figure 1.

In Figure 1 of the drawings there is shown at 10 an end portion of an engine crankshaft to be tested. Fixed to the end of the crankshaft for rotation therewith is a member 12 having a portion 14 adapted to be engaged by a cone clutch element 16 fixed to a sleeve 18. The member 12 also has jaws 20 which are adapted to be engaged by mating jaws 22 carried by an annular member 24. These parts are shown in the engaged position in Figure 1 and constitute a jaw clutch.

A bellows or diaphragm 26 is fixed at one end to member 24 and at its other end to a flange 28 formed integral with one end of a shaft or spindle 30. The left hand or shaft 30 as viewed in Figure 1 forms a hollow cylinder 32 within which the sleeve 18 is supported for slidable movement in a longitudinal direction. The sleeve 18 has a longitudinal slot 34 cooperating with a key 36 carried by the hollow cylindrical portion 32 of the shaft 30. The construction is such that the sleeve 18 and clutch element 16 carried thereby are free to be moved longitudinally with respect to the shaft 30 but rotary movement imparted to the sleeve 18 will rotate the shaft 30. A helical spring 38 within the sleeve 18 and cylinder 32 biases the sleeve 18 and cone clutch element 16 carried thereby to the left as viewed in Figure 1.

Shaft 30 is supported for rotation in a bearing 40 carried by a housing member 42. The right-hand end of shaft 30 is formed as a sleeve-portion 44 within which is a helical spring 46 which biases a rod 48 carrying a center marker 50 to the right as viewed in Figure 1. Secured to the right-hand end of shaft 30 by a nut 52 is an arm 54. Surrounding a portion of the shaft 30 is a sleeve bearing 56 which is press-fitted or otherwise non-rotatably fixed within a flywheel or inertia mass 58. The inertia mass is resiliently driven from shaft 30 through the spiral spring 60, the outer end of the spring being secured as by member 62 to the inertia mass and the inner end secured to the shaft 30 by means of the connector 64. It will be obvious that the rotary and vibratory movements of the crankshaft are imparted to shaft 30. The spring 60 absorbs vibratory movement of the shaft 30 so that the inertia mass rotates at the average speed of rotation of the shaft. The bearing 56 permits the shaft 30 to move freely therein to accommodate the relative rotary movement between the shaft and inertia mass resulting from torsional vibration in the crankshaft.

The arm 54 carries at its outer end, by a pivoted connection, a leg 66. Another leg 68 is pivoted to one face of the inertia mass near the outer peripheral edge thereof. The outer ends of the legs 66 and 68 support or carry a stylus or scriber 70.

Cooperating with the housing member 42 is an outer housing member 72 which is mounted for movement relative to the housing portion 42. Pins 74 fixed to member 42 are adapted to move within slots 76 formed in housing portion 72. A spring means 78 may be provided to bias housing portion 72 to the right relative to housing portion 42.

Mounted in the housing member 72 is a supply spool 80 carrying a supply of waxed paper, a take-up spool 82 and a support or backing 84. The backing member 84 acts as a support for the waxed paper 85 when records are being impressed thereon by the stylus or scriber. A handle 86 is also secured to the housing member 72.

In the operation of the device the member 12 is first secured to the crankshaft or other part to be tested. While the crankshaft is rotating the indicator is moved to the left as viewed in Figure 1. The cone clutch element 16 first contacts the mating member 14 carried by the crankshaft to start rotation of shaft 30 and to synchronize its speed of rotation with that of the engine crankshaft. During engagement of the cone clutch the helical spring 38 is compressed as shown in Figure 1. The cone clutch acts as a synchronizer to bring up the speed of the shaft 30 to that of the crankshaft, whereupon the jaw clutch provides a positive drive. The diaphragm or bellows 26 constitutes axially resilient, torsionally substantially inflexible means for driving the spindle 30 and takes care of any small angular misalignment that there may be between the crankshaft and the shaft or spindle 30.

Shaft 30 being positively driven from the crankshaft will respond to the rotary and vibratory movements thereof. The vibrations, however, will be absorbed in the resilient drive 60 and will, therefore, not affect the flywheel or inertia mass and it will rotate at the average speed of rotation of the crankshaft. Torsional vibration of the rotating crankshaft thus will result in small relative movements between the shaft 30 and the flywheel or inertia mass 58. Since arm 54 is secured to the shaft 30 it will also partake of the rotary and vibratory movements imparted to the shaft 30. The legs 66 and 68 connected to the arm and flywheel, respectively, will therefore cause the stylus to move in and out in directions substantially radially of the flywheel in accordance with relative movement between the shaft 30 and flywheel.

When it is desired to make a record, the housing portion 72 carrying the waxed paper is moved to the left to housing portion 42 until the paper is brought into contact with the stylus and center marker as shown in Figure 1.

Various changes may be made in the embodiment of my invention shown and described herein without departing from the principle and spirit of the invention.

I claim:

1. In apparatus for exhibiting torsional vibration in a rotating shaft having a friction clutch element and a jaw clutch element rotatable therewith, a spindle adapted to be rotated by said shaft so as to partake of rotary and oscillatory movements thereof, means including a friction clutch element complementary to the aforesaid friction clutch element for starting rotation of the spindle and synchronizing it with that of said rotary shaft, and means positively rotating said spindle after its speed of rotation has been synchronized with that of the shaft, the second-mentioned means including a jaw clutch element complementary to the aforesaid jaw clutch element and axially resilient, torsionally substantially inflexible means connecting the second-mentioned jaw clutch element to the spindle.

2. A vibration exhibiting device for use with a rotating member, said device comprising a friction clutch element, a jaw clutch element, a support for the friction and jaw clutch elements fixed to the rotating member in alinement with its axis of rotation, a rotatable spindle, a rotatable inertia mass, resilient means connecting the spindle and inertia mass to rotate the inertia mass at the average speed of the spindle, means for exhibiting relative angular movement between the spindle and inertia mass, a second friction clutch element complementary to the first-mentioned friction clutch element, the second friction clutch element being carried by the spindle and non-rotatable with respect thereto, a second jaw clutch element complementary to the first-mentioned jaw clutch element, a support for the second jaw clutch element fixed to the spindle, an axially resilient, torsionally substantially inflexible means carrying one of the jaw clutch elements on its support, the friction clutch elements being arranged for initial contact when the second friction and jaw clutch elements are moved toward the first-mentioned friction and jaw clutch elements for engagement therewith, one of the friction clutch elements being movable axially of the spindle when engagement of the complementary friction clutch elements is completed and the jaw clutch elements being arranged for engagement after the friction clutch elements are engaged, whereby the device may be applied to the rotating member, while the rotating member is rotating, to start rotation of the spindle, to synchronize its rotary speed with that of the rotating member and then to drive the spindle positively from the rotating member.

3. A vibration exhibiting device for use with a shaft having a cone clutch element and a jaw clutch element, said device comprising a rotatable spindle, a flywheel, resilient means connecting the spindle and flywheel to rotate the flywheel at the average speed of the spindle, means for exhibiting relative angular movement between the spindle and the flywheel, a second cone clutch element complementary to the cone clutch element on the shaft, the second cone clutch element being carried by the spindle in axially slidable non-rotatable relation thereto, a second jaw clutch element complementary to the jaw clutch element on the shaft, axially resilient, torsionally substantially inflexible means securing the second jaw clutch element to the spindle for positively driving the spindle from the shaft through the jaw clutch elements and adapted to compensate for small misalignment between the shaft and spindle, and resilient means biasing the second cone clutch element axially outwardly of the spindle to facilitate sequential engagement of the cone clutch elements with each other and of the jaw clutch elements with each other, whereby the device may be applied to the shaft, while the shaft is rotating, to start rotation of the spindle, to synchronize its rotary speed with that of the shaft and then to drive the spindle positively from the shaft.

4. A vibration exhibiting device adapted to be applied to a rotating shaft having clutch means, said device comprising a housing member, a spindle rotatably carried by the housing member, an inertia mass carried rotatably within the housing member, resilient means connecting the spindle and inertia mass to rotate the inertia mass at the average speed of the spindle, exhibiting means carried by the spindle and inertia mass for exhibiting angular movement between the spindle and inertia mass, clutch means complementary to the first-mentioned clutch means, the second-mentioned clutch means being secured to the spindle for rotation therewith and being adapted to engage the first-mentioned clutch means with a slip engagement to start rotation of the spindle when the device is applied to the shaft while the shaft is rotating and to drive the spindle positively when the speed of the spindle has been brought up to that of the shaft, a second housing member movable relative to the first-mentioned housing member, and supporting means carried by the second housing member for an element adapted to receive a record from the exhibiting means, the second housing member being biased normally to a position where the supporting means prevents the element from receiving a record but being moved, as the device is applied to the shaft, to a position where the supporting means enables the element to receive a record.

5. A portable vibration exhibiting device adapted to be applied to a rotating member having clutch means, said device comprising a housing member, a spindle rotatably carried by the housing member, an inertia mass rotatably carried within the housing member and driven by the spindle, means resiliently connecting the spindle and inertia mass to rotate the inertia mass at the average speed of the spindle, exhibiting means carried by the spindle and inertia mass for exhibiting angular movement between the spindle and inertia mass, clutch means having elements complementary to the first-mentioned clutch means, the second-mentioned clutch means being secured to and carried by one end portion of the spindle for rotation therewith and being adapted to engage the first-mentioned clutch means with a slip engagement to start rotation of the spindle when the device is applied to said rotating member while it is rotating and to drive the spindle positively when the speed of the spindle has been brought up to that of said rotating member, the complementary elements of the second-mentioned clutch means being biased axially outwardly from said end portion of the spindle, a second housing member telescopically mounted with respect to the first-mentioned housing member, supporting means carried by the second housing member for an element adapted to receive a record from the exhibiting means, and means normally biasing the second housing member to a position relative to the first housing member preventing the element from receiving a record, the last-mentioned means being overcome as the device is applied to said rotating member and the second housing member being moved relative to the first-mentioned housing member to a position enabling the record receiving element to receive a record from the exhibiting means.

6. In apparatus for exibiting torsional vibration in a rotating member, a spindle adapted to be rotated by said member, means for starting rotation of the spindle and synchronizing it with that of said rotating member, said means including a friction clutch element carried by the spindle for rotation therewith but slidable therealong and resilient means biasing the friction clutch element outwardly axially from the spindle, and means for positively rotating the spindle after its rotation has been synchronized with that of said rotating member, the last-mentioned means including a jaw clutch element and axially resilient, torsionally substantially inflexible means fixed to the jaw clutch element and to the spindle.

7. In apparatus for exhibiting torsional vibration in a rotating member, a spindle having a hollow end portion and a radial flange and being adapted to be rotated by said member, means for starting rotation of the spindle and synchronizing it with that of said rotating member, said means including a cone clutch element having a sleeve carried in the hollow end portion of the spindle for rotation therewith but slidable therealong and resilient means within the sleeve for biasing the cone clutch element outwardly axially from the spindle, and means for positively rotating the spindle after its rotation has been synchronized with that of said rotating member, the last-mentioned means including a jaw clutch element radially outwardly from the cone clutch element and a bellows fixed to the jaw clutch element and to the radial flange on the spindle.

8. A vibration exhibiting device for use with a rotating member having clutch means including a slip engagement element and a positive engagement element, said device comprising a rotatable spindle, a flywheel, resilient means connecting the spindle and flywheel to rotate the flywheel at the average speed of the spindle, means for exhibiting relative angular movement between the spindle and the flywheel, clutch means adapted to engage the first-mentioned clutch means, the second-mentioned clutch means including one element complementary to said slip engagement element and a second element complementary to said positive engagement element, means carrying said one element on the spindle in axially movable non-rotatable relation thereto and biasing it axially outwardly of the spindle to facilitate initial slip engagement and subsequent positive engagement of the two clutch means, and means securing said second element to the spindle and including a bellows for effecting a positive drive fixed to said second element and to the spindle, whereby the device may be applied to said rotating member to synchronize the rotation of the spindle with that of said rotating member and to drive the spindle positively from said rotating member.

THOMAS C. VAN DEGRIFT.

REFERENCES CITED

The following references are of record in the file of this patent:

UNITED STATES PATENTS

| Number | Name | Date |
|---|---|---|
| 196,822 | Osborn | Nov. 6, 1877 |
| 265,496 | Haskin | Oct. 3, 1882 |
| 776,404 | Keyser | Nov. 29, 1904 |
| 1,571,349 | Summers | Feb. 2, 1926 |
| 1,909,568 | Broughton | May 16, 1933 |
| 2,069,271 | Prescott | Feb. 2, 1937 |
| 2,167,373 | Rocke | July 25, 1939 |
| 2,336,172 | Helgeby | Dec. 7, 1943 |

Certificate of Correction

Patent No. 2,474,408. June 28, 1949.

THOMAS C. VAN DEGRIFT

It is hereby certified that errors appear in the printed specification of the above numbered patent requiring correction as follows:

Column 1, line 45, for the words "hand or" read *hand of*; column 3, line 33, after "left" insert *relative*; line 50, claim 1, after "means" insert *for*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*